US008396589B2

(12) United States Patent
Katzenstein Garibaldi et al.

(10) Patent No.: US 8,396,589 B2
(45) Date of Patent: Mar. 12, 2013

(54) ELECTRONIC DEVICE FOR THE SALE OF INTANGIBLE PRODUCTS IN VENDING MACHINES

(75) Inventors: Martin Katzenstein Garibaldi, Montevideo (UY); Julian Oreggioni Gamou, Montevideo (UY); Alvaro Alejandro Cardozo Martinez, Montevideo (UY)

(73) Assignee: Pranasys S.A. (UY)

( * ) Notice: Subject to any disclaimer, the term of this patent is extended or adjusted under 35 U.S.C. 154(b) by 1042 days.

(21) Appl. No.: 12/264,052

(22) Filed: Nov. 3, 2008

(65) Prior Publication Data

US 2009/0177319 A1 Jul. 9, 2009

(30) Foreign Application Priority Data

Nov. 1, 2007 (UY) .......................................... 30685

(51) Int. Cl.
*G06F 17/00* (2006.01)

(52) U.S. Cl. ......................... 700/232; 700/236; 700/241

(58) Field of Classification Search .................. 700/236, 700/231, 232, 241, 244
See application file for complete search history.

(56) References Cited

U.S. PATENT DOCUMENTS

| | | | | |
|---|---|---|---|---|
| 5,823,386 | A * | 10/1998 | Vandenberg | 700/243 |
| 5,850,075 | A | 12/1998 | Brannan et al. | |
| 6,505,095 | B1 * | 1/2003 | Kolls | 700/244 |
| 6,571,150 | B2 * | 5/2003 | Arai et al. | 700/236 |
| 6,584,309 | B1 * | 6/2003 | Whigham | 705/16 |
| 6,675,067 | B2 * | 1/2004 | Blad | 700/244 |
| 6,748,296 | B2 | 6/2004 | Banerjee et al. | |
| 6,820,816 | B1 | 11/2004 | Reid | |
| 6,917,853 | B2 | 7/2005 | Chimomas | |
| 6,925,335 | B2 * | 8/2005 | May et al. | 700/9 |
| 7,076,329 | B1 | 7/2006 | Kolls | |
| 7,353,080 | B2 | 4/2008 | Walker | |
| 2007/0203836 | A1 | 8/2007 | Dodin | |
| 2009/0164043 | A1 | 6/2009 | Martinez et al. | |
| 2009/0236953 | A1 | 9/2009 | Cardozo Martinez | |

FOREIGN PATENT DOCUMENTS

| | | |
|---|---|---|
| ES | 2190878 B1 | 1/2006 |
| MX | 2469 | 7/2011 |

OTHER PUBLICATIONS

MDB Protocol, Multi-Drop Bus/Internal Communication Protocol, MDB/ICP, National Automatic Merchandising Association (NAMA), Version 3.0, Mar. 26, 2003.
EVA-DTS Protocol, Data Transfer Standard, European Vending Association (EVA), Version 6.0, May 2004.
EVA-CVS Protocol, Cashless Vending Specification, European Vending Association (EVA), Version 1.2, Feb. 2001.
EVA-DTS, Appendix B—Manufacturer Codes, Version 6.1, May 15, 2008, pp. 1-6.

(Continued)

*Primary Examiner* — Timothy Waggoner
(74) *Attorney, Agent, or Firm* — Kilpatrick Townsend & Stockton LLP

(57) ABSTRACT

An electronic device for the sale of intangible products through vending machines that includes an interface to communicate with external peripherals through the MDB protocol, an interface to communicate with external peripherals through the RS232 standard, an interface to communicate with external peripherals through the DEX protocol, an interface to communicate with users, a communications system which enables it to act as part of a network and communicate with a central system, and a controller, which articulates the communication among the above-mentioned components, so as to enable a central system to perform diverse actions on a vending machine.

14 Claims, 4 Drawing Sheets

OTHER PUBLICATIONS

EVA-DTS, Appendix C—The Event List, Version 6.1, Apr. 2008, pp. 1-28.

* cited by examiner

ELECTRONIC DEVICE FOR THE SALE OF INTANGIBLE PRODUCTS IN VENDING MACHINES

There are two widespread protocols of use concerning the operation of vending machines: the MDB protocol, issued by the NAMA (See MDB Protocol, Multi-Drop Bus/Internal Communication Protocol, MDB/ICP, NAMA (National Automatic Merchandising Association), Version 3.0, 26 Mar. 2003), which consists of a voluntary standard with a high acceptance level, which regulates the communication by means of a 'master-slave' system between the machine controller and the different peripherals coexisting with it, such as coin mechanisms, bill validators, and peripherals which do not use cash, such as credit card readers ("cashless devices") etc. The other one is the DEX protocol, issued by EVA (See EVA-DTS Protocol, Data Transfer Standard, EVA (European Vending Association) Version 6.0, May 2004). It also consists of a voluntary, comprehensive standard, widely used by vending machines. It defines how the communication should be established between the controller of one of the machines and another device, so that the first one conveys to the second data on sales, alarms and diverse types of events.

There are numerous antecedent cases referred to the sales of products through vending machines, with alternative payment methods. However, all of them refer to the general system (e.g. "VENDING MACHINE PURCHASE VIA CELLULAR TELEPHONE", U.S. Pat. No. 6,584,309; "A SYSTEM TO MAKE TRANSACTIONS THROUGH VENDING MACHINES FROM MOBILE PHONE TERMINALS", Pat. ES 2,190,878; "TEXT MESSAGE PAYMENT", Pat. US 20070203836, et al).

It is also possible to find diverse types of devices which, through the DEX protocol, obtain the data provided by vending machines. However, the sale of intangible products through vending machines has no antecedents. On top of this, no other device has ever before included all the functions performed by the device herein described.

DESCRIPTION OF THE INVENTION

Figure 1:
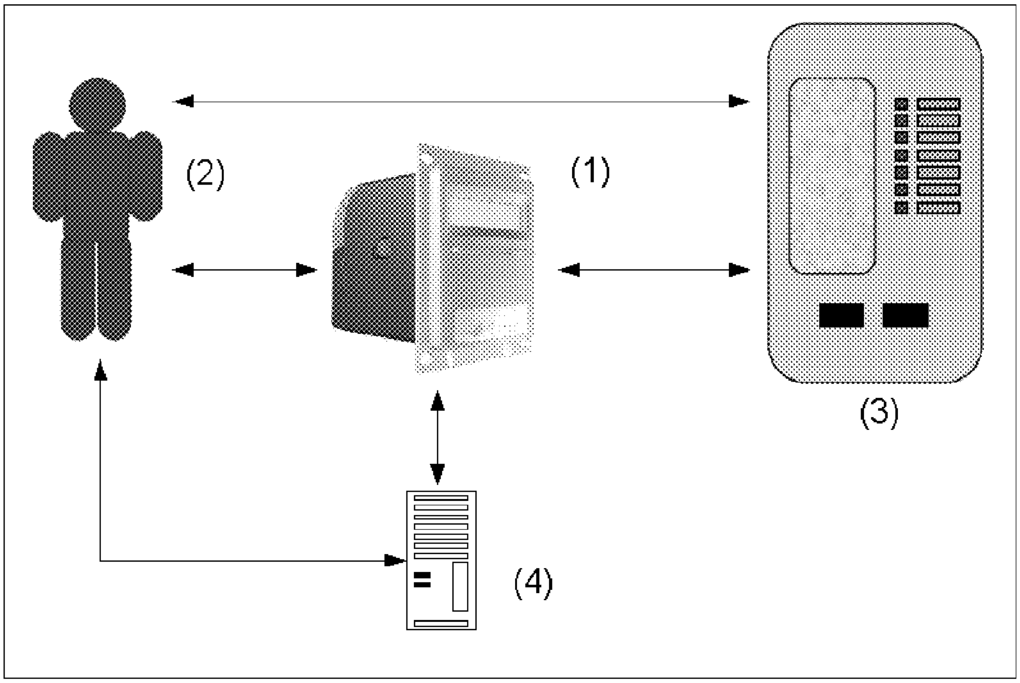
FIG. 1 is a block diagram showing interactions between a user, an electronic device, a vending machine, and a central system, in accordance with one embodiment of the invention.

The FIG. 1 shows the device (1) whose authorship and patentability are claimed, consists of a system based on a micro-controller installed within a vending machine (3), which enables a Central System (4) to request certain services from the machine. One of these services is remarkable due to its newness: the possibility that a user (2) can purchase intangible products through a vending machine (3).

Intangible products must be understood to be the purchase of, for instance, pre-paid cell phone cards, show tickets, public transport tickets, frequent buyer bonus programs or incentives, parking tickets, etc.

Figure 2:
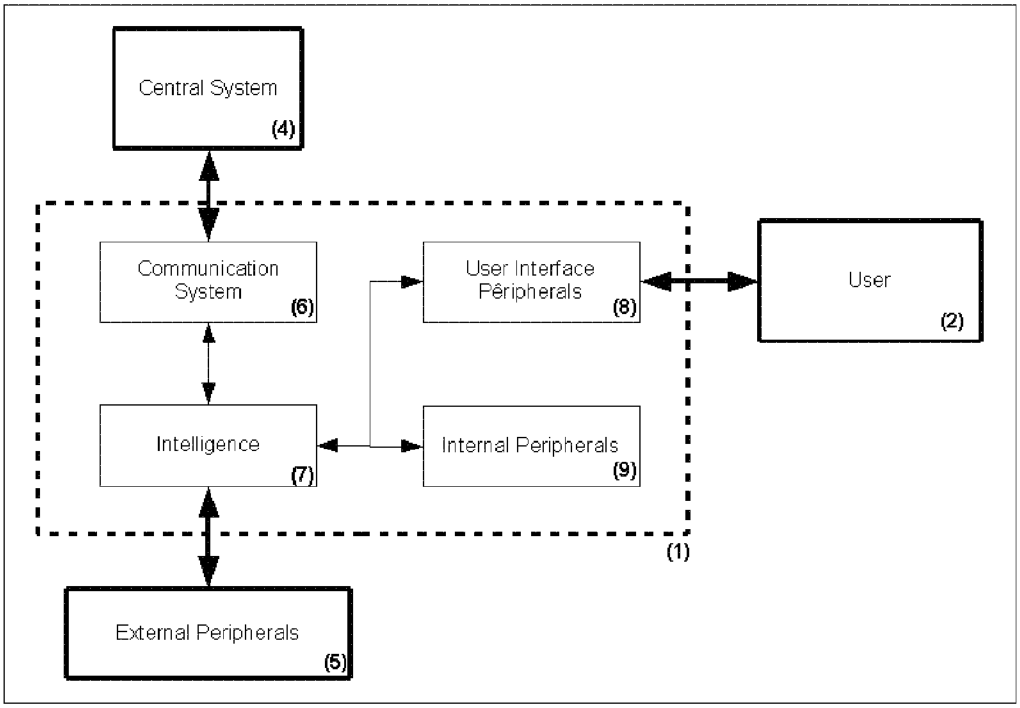
FIG. 2 is block diagram of an electronic device, in accordance with one embodiment of the invention.

FIG. 2 shows a scheme of the device (1), whose core is "an intelligent device" (7), which may be a micro-controller, a micro-processor, a programmable logic device (PLD or FPGA) or any other chip whose operating system is embedded within the hardware containing it.

The Intelligence (7) is able to control "Internal Peripherals" (9) through a serial protocol (USART, etc.) such as, for example, a micro controller or a non volatile external memory (EEPROM or other). Along with the "Internal Peripherals" (9) they implement the basic functionalities of the device.

In order to interact with the user (2) the device (1) is able to control "user interface peripherals" (8) such as a thermal printer or a 16×2 characters LCD display monitor.

The device (1) is able to interact, through the MDB protocol, with "External Peripherals" (5) located within the vending machine (3). These peripherals may be vending machines, coin mechanisms, bill validators or card readers.

The device (1) can communicate with vending machines through the DEX (Data Exchange) protocol of EVA, and with any peripheral handling the RS232 standard (e.g. a PC).

The "Communication System" (6), meanwhile, consists of a GPRS modem and the different components needed for its proper functioning (antenna, SIM card, etc) even when the device (1) can optionally handle other communication technologies (WIFI, WIMAX, satellite). For other cases, when it is not possible to work with wireless methods, wired communication means can be used (ETHERNET, land telephone lines).

The device (1) has expansion ports, fit to incorporate expansion printed circuit boards which enable communication with external or internal peripherals or user interfaces. Some examples are:

- Proximity cards (NFC)
- Other electronic devices, through short range wireless communication protocols (e.g. BLUETOOTH or infrared).
- Credit card readers.
- Keyboard
- Global positioning system (GPS)

If a short range wireless transmitter/receiver (e.g. BLUETOOTH) were installed in one of the expansion ports, a direct communication could be established between the user (2) and the device (1). In fact, if the user (2) had a cell phone, a PDA or a similar device with a transmitter/receiver implementing the same features as the one installed in the expansion port of the device (1), there would be a procedure which would enable the user (2) to directly start the transaction by establishing communication with the device (1).

Due to its own nature, data security is also a relevant issue of the device. For this purpose, even when it has the encryption typical of a GPRS protocol, deeper security levels can be implemented in the device (1), such as for example AES-128.

The device (1) integrates all of its elements into one single container, which enables its proper installation within the space determined by the MDB protocol. The container can be easily assembled and accessed for paper replacement. It also has an anti-vandal removable front cover. To sum up, its peculiar functional design introduces new features of its own, which make it worthy of the specific Utility Model patent claim.

The device (1) needs to interact with peripherals which may demand high power consumption (thermal printer, GRPS modem, etc.). In addition, the MDB protocol establishes a nominal supply voltage of 34 VDC, which must be reduced to standard levels (usually 3.3 VDC or 5 VDC). Such voltage adaptation must be performed efficiently, so as to prevent heat dissipation from causing functional problems.

For this purpose, the solution achieved in (1) guarantees the consumption levels required, needless to use complex ventilation mechanisms, which require maintenance and would occupy unavailable space.

Figure 3:
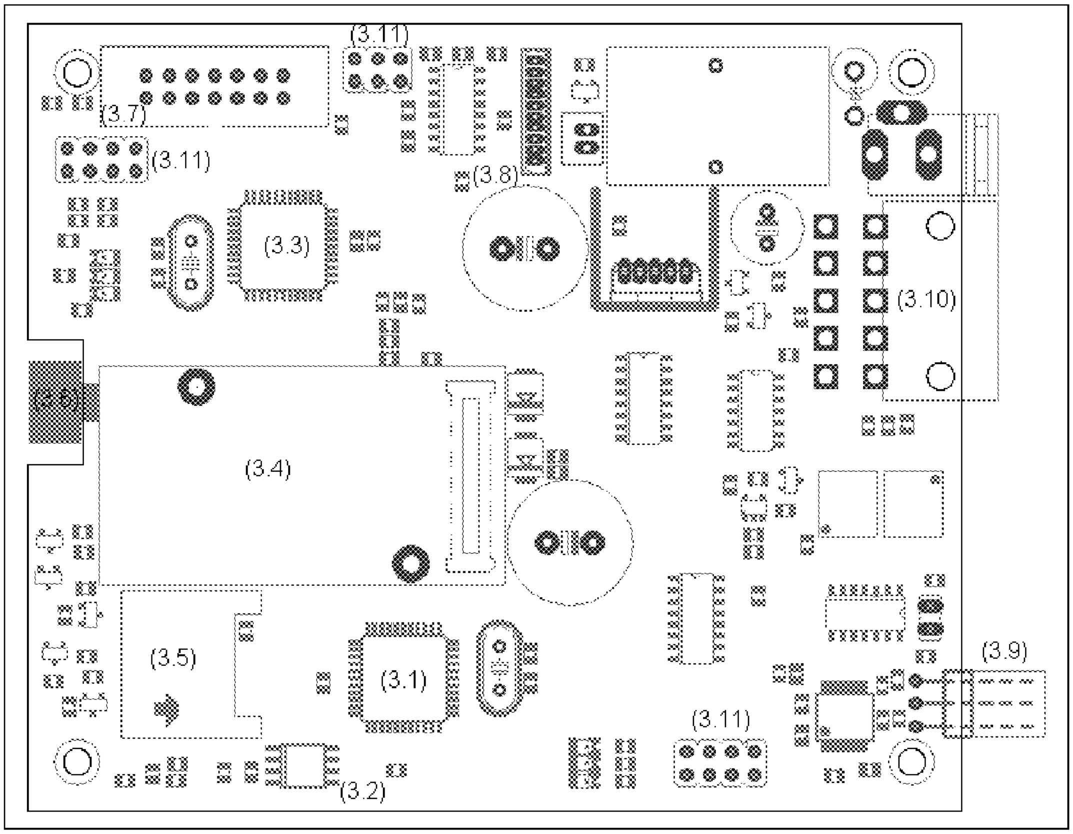
FIG. 3 is a block diagram showing components on a printed circuit board, in accordance with one embodiment of the invention.
Figure 4:
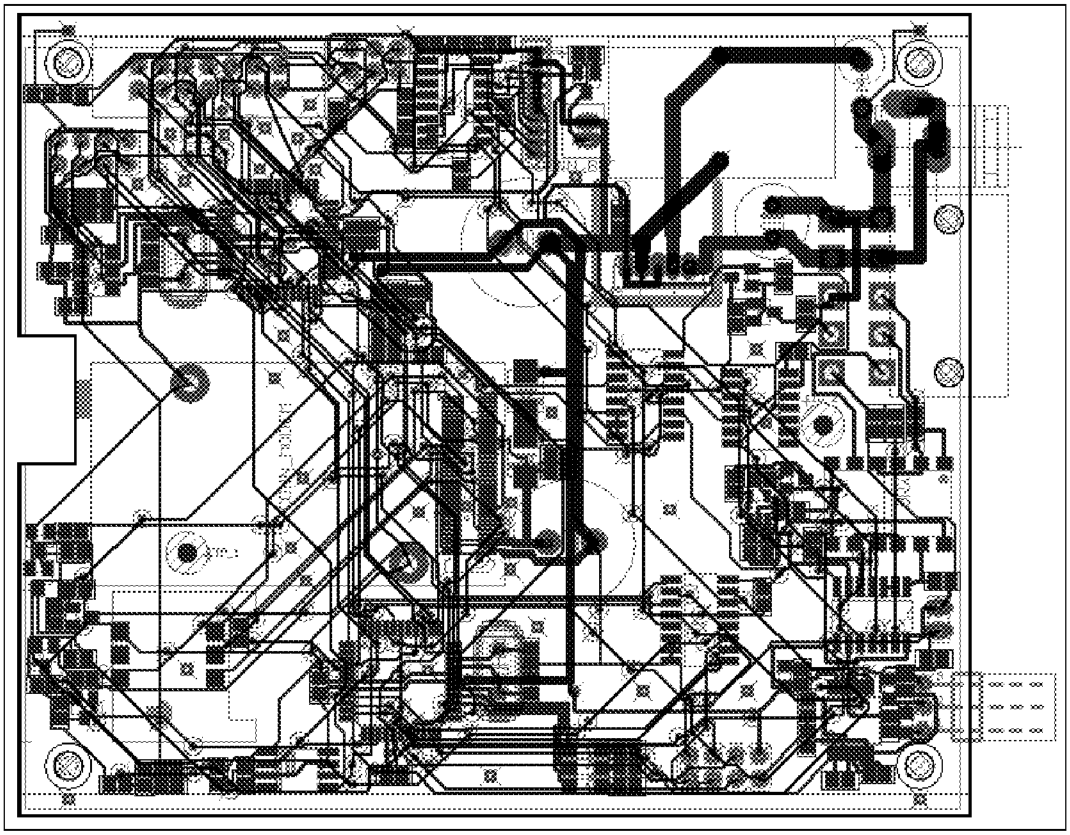
FIG. 4 is a block diagram showing the wiring of the components of the printed circuit board of FIG. 3, in accordance with one embodiment of the invention.
Figure 5:
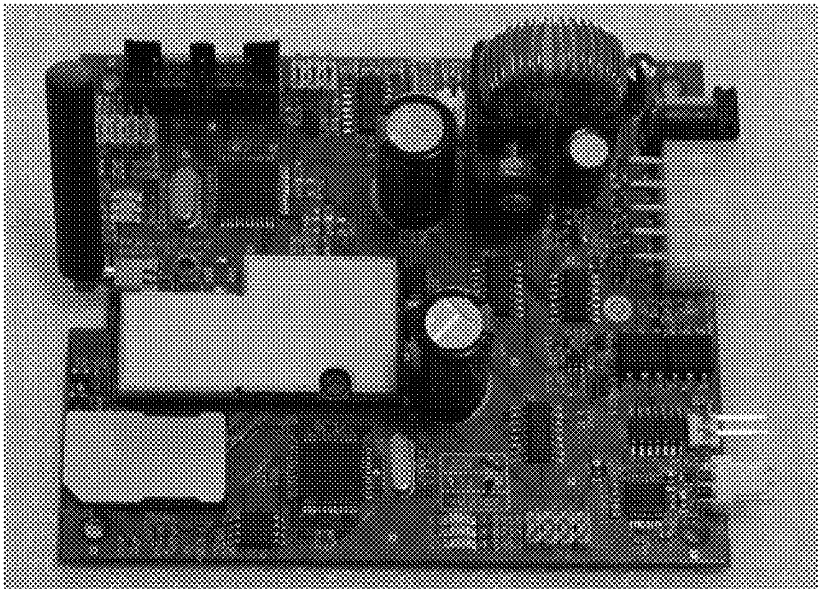
FIG. 5 is a photograph of an assembled circuit board, in accordance with one embodiment of the invention.

FIG. 3 shows a diagram of the components of the printed circuit board of the device (1); FIG. 4 shows a diagram of the wiring of the components, whereas FIG. 5 shows a picture of the assembled board.

The labels included in FIG. 3 refer to:

(3.1) is the main micro-controller, defined as "Intelligence" in FIG. 2.

(3.2) is the EEPROM memory. It is part of the "Internal Peripherals" (9).

(3.3) is an auxiliary micro-controller. It is part of the "Internal Peripherals" (9).

(3.4) is the space and connector for modem. It is part of the "Communication System" (6).

(3.5) is the connector for the SIM card. It is part of the "Communication System" (6).

(3.6) is the connector for the antenna. It is part of the "Communication System" (6).

(3.7) is the connector for the 16×2 character LCD display. It is part of the "Peripherals for the Interface with the Users" (8).

(3.8) is the connector for the printer. It is part of the "Peripherals for the Interface with the Users" (8).

(3.9) is the connector for the DEX cable or RS232 cable (PC). It is part of the interface with the "External Peripherals" (5).

(3.10) is the connector for the special MDB cable. It is part of the interface with the "External Peripherals" (5).

(3.11) are the expansion ports. Depending on the application, (3.7) and (3.8) can also be used with the above-mentioned purpose.

Some hardware circuits found in the printed circuit board (FIG. 3), the Intelligence (7) and a cable with special features (FIG. 6) are required so that the device (1) can take control of the external MDB peripherals (bill validator, coin mechanism, credit card reader, etc.) in order to enable the purchase of intangible products through the vending machine.

Figure 6:
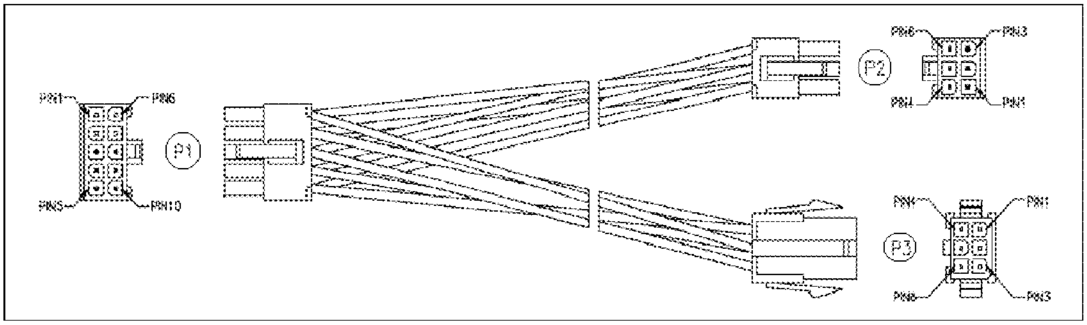

FIG. 6 shows a 10-circuit cable, connected on one end to the device (1) (FIG. 6, connector P1). On another end, it is connected to the vending machine controller (FIG. 6, connector P3), and on the third end it is connected to the first peripheral of the MDB bus (FIG. 6, connector P2). The three devices are linked by means of this cable, in accordance with the following connection scheme:

| Connector P1 | Connector P2 | Connector P3 | Name of signal (as per MDB Protocol) |
|---|---|---|---|
| PIN 1 | PIN 2 | | Ground (GND) |
| PIN 2 | PIN 1 | | Supply voltage (34 DVC) |
| PIN 3 | PIN 6 | | Standard for communications |
| PIN 4 | PIN 5 | | Master transmission |
| PIN 5 | PIN 4 | | Master reception |
| PIN 6 | | PIN 2 | Ground (GND) |
| PIN 7 | | PIN 1 | Supply voltage (34 DVC) |
| PIN 8 | | PIN 6 | Standard for communications |
| PIN 9 | | PIN 5 | Slave transmission |
| PIN 10 | | PIN 4 | Slave reception |

Pins 3 of connectors P2 and P3 are not connected. Connectors P2 and P3 are MDB protocol compliant.

As the table shows, the cable delivers to device (1) all the signals of the MDB communications bus, thus allowing device (1) to communicate with the controller of the vending machine and take control of the MDB bus to use the peripherals.

OPERATION

Both the purchase of intangible products and the purchase of material products are transactions initiated by the user (2). The user establishes a communication with the Central System (4) and expresses its intention to make a transaction in the vending machine (3) where the device (1) is installed. The communication between the user (2) and the Central System (4) can be made directly, e.g. by sending an SMS text message or through device (1) by using the keyboard, a BLUETOOTH device or any other user interface with similar features.

The purchase of intangible products through a vending machine (3) is done using the following procedure:

1) The Central System (4) sends to the device (1) an order to collect money.

2) The device (1) takes control of the External Peripherals of money collection (e.g. a coin mechanism, a bill validator, or both).

3) During the process, the device (1) guides the user (2) through the LCD screen.

4) The user (2) inserts coins or bank notes.

5) Once the insertion of coins is completed, the device (1) sends to the Central System the information generated in the transaction (e.g. how much money was collected).

6) The Central System (4) approves the transaction; therefore the intangible product is actually sold to the user (2).

7) The device (1) informs the user (2) about the result of the operation by means of the LCD display, and prints a receipt.

8) If the transaction is not accepted, the money can be returned or kept for future transactions.

The purchase of tangible products through a vending machine (3) has been implemented in accordance with the MDB protocol. Pursuant to it, the device (1) is a level 1 "cashless device", and acts in the following way:

1) The Central System (4) sends to the device (1) an amount of money for purchasing products.

2) Following the steps established by the MDB protocol, the device interacts with the vending machine (3) so that said amount is actually credited in the vending machine.

3) Next, the user (2) performs the purchase transaction.

4) The remaining amount, if any, is reported to the Central System (4).

Lastly, the device (1) can also report telemetry data to the Central System (4) through two sources:

1) The data reported by the vending machine (3) towards the device (1) through the DEX protocol, which depends heavily on the version and compliance degree of the vending machine (3) to the DEX protocol (in general adjustable through a firmware update).

There follow some examples (for further details see (2)):

Sales data for each product.

Data on how much money is within the vending machine (3).

Data of the vending machine (3): trademark, model, firmware version, etc.

Miscellaneous alarms: lack of products, failures in cooling system, etc.

Miscellaneous data: date and time about the last time the door was opened, etc.

2) The data that the device can generate (1) by interacting directly with the different peripherals. E.g.:

GPRS signal strength.

Alarm indicating vandalism on the vending machine (3).

Alarm indicating lack of paper in the printer.

Alarm indicating communication error with External Peripherals.

Alarm indicating money collection with no response from the Central System (4).

Through the MDB protocol it is possible to obtain data of the peripherals: trademark, model, firmware version, etc.

Device data: serial number, identification number of SIM card, modem, etc.

The device (1) can render other useful services to the Central System (4), such as the following:

1) The Central System (4) can send messages to the LCD display of the device (1); the messages can stay there for a definite or an indefinite time.

2) The Central System (4) can also send texts to be printed by the display device (1).

3) The Central System (4) can request the device (1) to move to 'out of order' status for a certain time, during which time no actions can be performed by the device.

4) The Central System (4) can update the firmware programmed on the device (1).

5) The Central System (4) can also configure certain parameters, such as time between alarms, connection parameters, etc.

Glossary

AES-128: acronym for "Advanced Encryption Standard", an encrypting standard issued by the NIST (National Institute of Standards and Technology), also known as "U.S. FIPS PUB 197 (FIPS 197)".

Bluetooth: specification for short range wireless networks (IEEE 802.15).

Bill validator: a device which recognizes and manages bank notes which can be credited in a system to purchase goods or services.

Cashless device: a device which recognizes and manages payment methods other than cash and which can be credited in a system to purchase goods or services.

DEX: data transfer protocol between a vending machine and an external device. For further details see [2].

EEPROM: acronym for "Electrically Erasable Programmable Read-Only Memory", a programmable, electrically erasable memory.

Ethernet: name for a LAN computer network technology, based on data frames (IEEE 802.3).

Firmware: computer program that is embedded in a hardware device.

GPRS: acronym for "General Packet Radio Service", a modification in the method of sending data in a GSM network.

GPS: acronym for "Global Position System", a satellite navigation system which permits determining the position of an object in any part of the world.

GSM: acronym for "Global System for Mobile communications", a cellular telephone network standard.

LCD: acronym for "Liquid Crystal Display", an electrical system which permits displaying data by means of liquid crystals.

MDB: a communication protocol between the controller of a vending machine and the peripherals which compose it (coin mechanism, etc.). For further details see [1].

Coin mechanism: a device which recognizes and stores coins, which can be credited in a system to purchase goods or services.

NFC: acronym for "Near Field Communication", a short range wireless communication technology.

PC: acronym for "Personal Computer".

RS232: acronym for "Recommended Standard 232", a standard to establish serial communications issued by the EIA (Electronic Industries Alliance).

SIM: acronym for "Subscriber Identity Module", a card which safely stores the identification of subscription to a cell phone service.

SMS: acronym for "Short Message Service". It identifies the text messages sent from or to a cell phone.

USART: acronym for "Universal Synchronous Asynchronous Receiver Transmitter", a serial communication technology.

WIFI: a set of standards for wireless networks (IEEE 802.11).

WIMAX: acronym for "Worldwide Interoperability for Microwave Access", a wireless data transfer standard (IEEE 802.16)

What is claimed is:

1. An electronic device for the sale of intangible products through a vending machine, comprising: an interface to communicate with external peripherals through a multi-drop bus (MDB) protocol, another interface to communicate with the external peripherals through an RS232 standard, an interface to communicate with the external peripherals through the DEX protocol, another interface to communicate with users, communications system which enables the electronic device to communicate through a network with a central system remote from the vending machine, and a controller which controls communication among the aforesaid interfaces and the communications system to allow the controller to take control of the external peripherals on behalf of the central system to enable a sale of an intangible product through the vending machine.

2. The electronic device of claim 1, wherein the electronic device permits purchase of tangible and intangible products from the vending machine, and generates a telemetry report on a plurality of system components to the central system.

3. The electronic device of claim 1, wherein the communications system is based on at least one of the following wireless communication protocols: GPRS, WIMAX, WIFI and satellite.

4. The electronic device of claim 1, wherein the communications system is based on one or several of the following wired communication protocols: ETHERNET and land telephone lines.

5. The electronic device of claim 1, wherein the interface to communicate with users comprises of one or several of the following devices: a thermal printer, an LCD display, an NFC card reader, a magnetic card reader, a keyboard, a keypad, and a wireless BLUETOOTH transmitter/receiver.

6. The electronic device of claim 1, further comprising: a cable which connects the electronic device to a controller of the vending machine and to a first peripheral of an MDB bus, in such a way that the cable delivers MDB bus signals, thus allowing the electronic device to communicate with the controller of the vending machine or to take control of the MDB bus to use peripherals of the MDB bus.

7. An electronic device for the sale of intangible products through a vending machine, comprising:

an interface to communicate with external peripherals through a multi-drop bus (MDB) protocol;

an interface to communicate with the external peripherals through an RS232 standard;

an interface to communicate with the external peripherals through the DEX protocol;

an interface to communicate with users;

a communications system which enables the electronic device to communicate through a network with a central system remote from the vending machine;

a controller which controls communication among the interfaces and the communications system to allow the controller to take control of the external peripherals on behalf of the central system to enable a sale of an intangible product through the vending machine;

wherein the electronic device permits purchase of tangible products and the intangible products from the vending machine, and the electronic device provides a telemetry report of a plurality of device components to the central system.

8. The electronic device of claim 7, wherein the communications system is based on at least one of the following wireless communication protocols: GPRS, WIMAX, WIFI and satellite.

9. The electronic device of claim 7, wherein the communications system is based on at least one of the following wired communication protocols: ETHERNET and land telephone lines.

10. The electronic device of claim 7, wherein the interface to communicate with users comprises at least one of the following devices: a thermal printer, an LCD display, an NFC card reader, a magnetic card reader, a keyboard, a keypad, and a wireless BLUETOOTH transmitter/receiver.

11. The electronic device of claim 7, further comprising: a cable which connects the electronic device to a controller of the vending machine and to a first peripheral of an MDB bus, in such a way that the cable delivers MDB bus signals, thus allowing the electronic device to communicate with the controller of the vending machine or to take control of the MDB bus to use peripherals of the MDB bus.

12. The electronic device of claim 3, further comprising: a cable which connects the electronic device to a controller of the vending machine and to a first peripheral of an MDB bus, in such a way that the cable delivers MDB bus signals, thus allowing the electronic device to communicate with the controller of the vending machine or to take control of the MDB bus to use peripherals of the MDB bus.

13. The electronic device of claim 4, further comprising: a cable which connects the electronic device to a controller of the vending machine and to a first peripheral of an MDB bus, in such a way that the cable delivers MDB bus signals, thus allowing the electronic device to communicate with the controller of the vending machine or to take control of the MDB bus to use peripherals of the MDB bus.

14. The electronic device of claim 5, further comprising: a cable which connects the electronic device to a controller of the vending machine and to a first peripheral of an MDB bus, in such a way that the cable delivers MDB bus signals, thus allowing the electronic device to communicate with the controller of the vending machine or to take control of the MDB bus to use peripherals of the MDB bus.

* * * * *